(12) United States Patent
Klesper et al.

(10) Patent No.: US 7,787,856 B1
(45) Date of Patent: Aug. 31, 2010

(54) CONVERGED EMERGENCY SERVICE CALL HANDLING

(75) Inventors: Stevan Klesper, Gardner, KS (US); Stephen Williams, Olathe, KS (US); Kevin McGinnis, Overland Park, KS (US); Arun Santharam, Overland Park, KS (US); Dan Durig, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 554 days.

(21) Appl. No.: 11/280,777

(22) Filed: Nov. 16, 2005

(51) Int. Cl.
*H04M 11/04* (2006.01)

(52) U.S. Cl. .......... 455/404.1; 455/404.2; 455/521; 455/560; 455/445; 370/352; 370/353; 370/354; 370/355; 370/356; 370/357

(58) Field of Classification Search .......... 455/404.1, 455/404.2, 521, 560; 370/352, 353, 354, 370/355, 356, 357
See application file for complete search history.

(56) References Cited

U.S. PATENT DOCUMENTS

| | | | | |
|---|---|---|---|---|
| 6,128,481 A | * | 10/2000 | Houde et al. | 455/404.2 |
| 2004/0057425 A1 | * | 3/2004 | Brouwer et al. | 370/352 |
| 2004/0087317 A1 | * | 5/2004 | Caci | 455/456.1 |
| 2006/0068753 A1 | * | 3/2006 | Karpen et al. | 455/404.2 |
| 2007/0003024 A1 | * | 1/2007 | Olivier et al. | 379/45 |

* cited by examiner

*Primary Examiner*—Rafael Pérez-Gutiérrez
*Assistant Examiner*—Nimesh Patel (57) ABSTRACT

A communication network for emergency service call handling, the communication network comprising a mobile switching center (MSC) configured to receive an emergency call from a wireless end device and transmit first call signaling indicating a call key for the emergency call and a public safety answering point (PSAP) for the call, and a gateway system configured to receive the first call signaling, process the first call signaling to generate second call signaling indicating the call key and the PSAP, transmit the second call signaling to a routing system, and connect the emergency call from the MSC to the routing system.

6 Claims, 8 Drawing Sheets

CONVERGED EMERGENCY SERVICE CALL HANDLING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to telecommunication technologies, and in particular, to converged emergency service call handling technologies.

2. Description of the Prior Art

Service providers, such as telecommunication carriers, are required to provide emergency call services to end users. For example, service providers are typically required to offer 911 calling capabilities. Specialized location determining systems are used to determine the physical location of callers when 911 calls are placed.

Currently, determining the location of a caller on a circuit switched network, such as the public switched telephone network (PSTN), is a relatively straight forward task because every end point in the PSTN is fixed. The physical address of an end point, such as a home address, can be stored in association with a calling number, such as a home phone number. When a 911 call is placed from the PSTN, a location determining system performs a look up to a database system to determine the physical address of the call based on the calling number. The location determining system also determines the appropriate public safety answering point (PSAP) for the call and provides the physical address to the PSAP. In the meantime, the call is transferred from the PSTN to the PSAP.

Traditional wireless networks, such as CDMA, TDMA, GSM, iDEN, and PCS networks, present additional challenges to the task of locating callers. Namely, wireless end points are not fixed. Thus, wireless users can roam to any location at will. As a result, the location of a wireless caller cannot be determined based on his calling number. In response to this problem, complex location determining systems have been developed to assist with determining the location of wireless callers. For example, radio frequency triangulation techniques are used to locate callers.

Packet communication networks, such as the public Internet, present challenge beyond even those of traditional wireless networks. Voice services are often times provided over packet communication networks. An example of a packet based voice service is Voice Over Internet Protocol (VOID). Like wireless networks, VOIP end points are not fixed. Therefore, the location of a VOW caller cannot be determined based on his calling number or other similar type of identification. In response, complex location determining systems have also been developed in the prior art for determining the location of VOIP callers.

Oftentimes, a service provider provides both traditional wireless services as well as VOIP service. As a result, the single service provider frequently bears the entire cost of operating multiple location determining systems for both a wireless network and a VOIP network.

Figure 1:
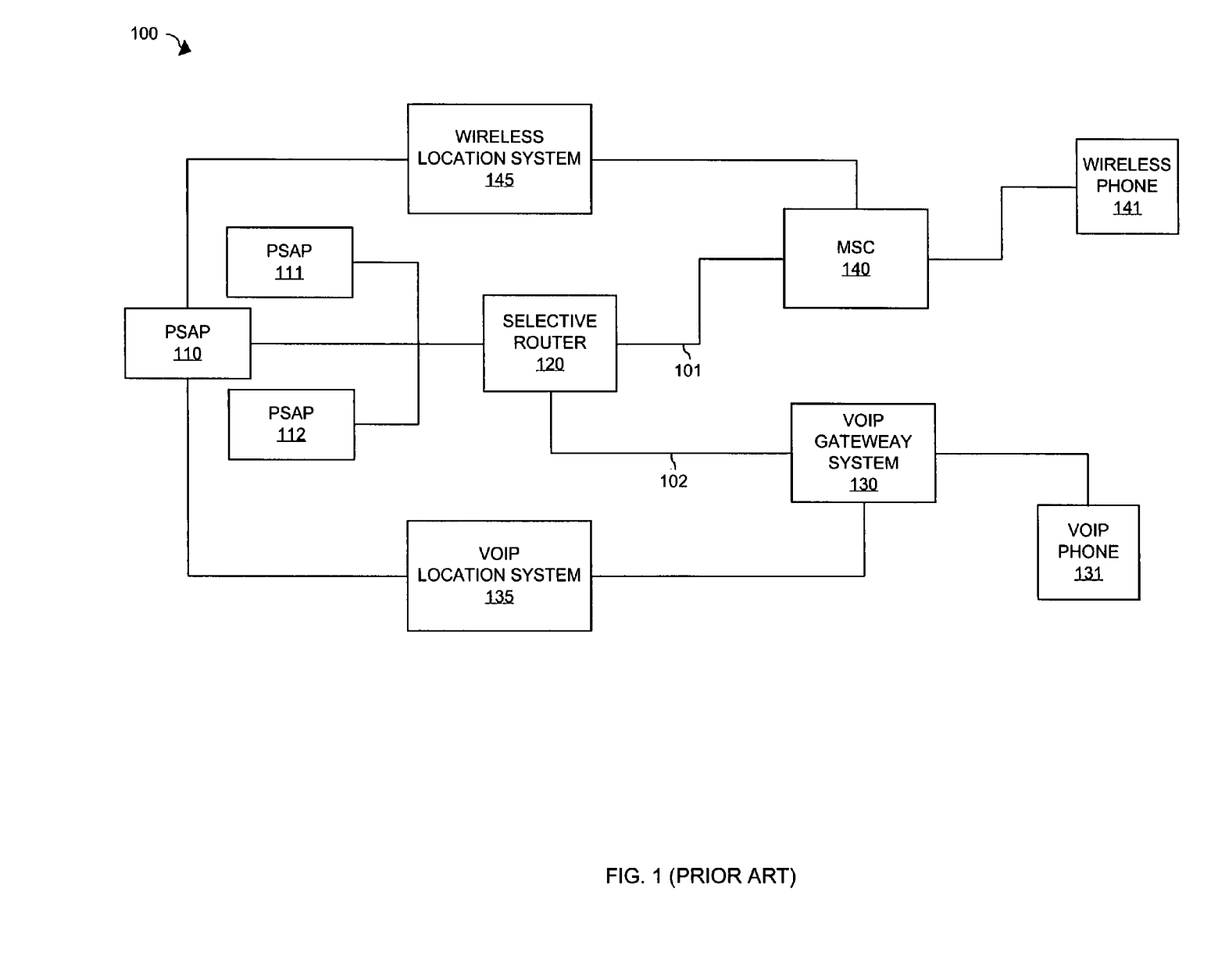
FIG. 1 illustrates a communication network in an example of the prior art.

FIG. 1 illustrates communication network 100 in the prior art whereby a single service provider operates multiple location determining systems for both a traditional wireless network and a VOIP network. Communication network 100 includes public safety answering point (PSAP) 110 coupled to wireless location system 145 and VOIP location system 135. Wireless location system 145 is coupled to mobile switching center (MSC) 140. VOW location system 135 is coupled to VOW gateway system 130. MSC 140 is coupled to selective router 120 by trunk 101. VOIP gateway system 130 is also coupled to selective router 120 by trunk 102. Wireless phone 141 is in communication with MSC 140. VOIP phone 131 is in communication with VOIP gateway system 130.

Figure 2:
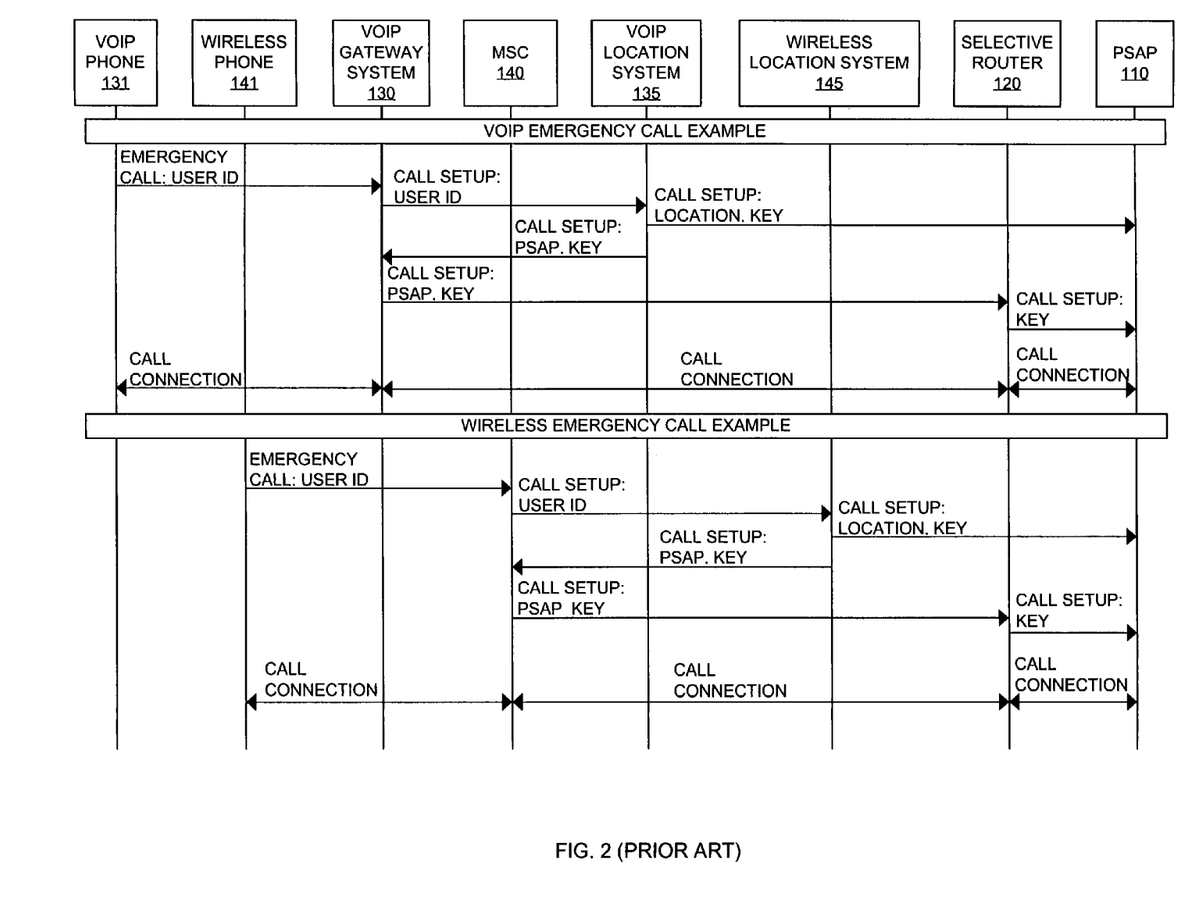
FIG. 2 illustrates a flow diagram in an example of the prior art.

FIG. 2 illustrates the operation of communication network 100 in an example of the prior art. A VOIP emergency call flow diagram is first described, followed by a description of a wireless emergency call flow diagram.

To begin, a VOIP user using VOIP phone 131 places an emergency call, such as by dialing 911. VOIP phone 131 responsively transmits the emergency call to VOIP gateway system 130. For instance, VOIP phone 131 might transmit the dialed digits along with a user identification that identifies the user to VOIP gateway system 130.

Upon receiving the emergency call and user identification, VOIP gateway system 130 initiates call setup for the emergency call by transmitting call setup signaling and the user identification to VOIP location system 135. VOIP location system 135 continues the call setup process by determining the location of the user based on the user identification. For example, VOIP location system 135 typically includes a location database that stores the physical address of users in association with their user identifications. In this case, VOIP location system 135 would perform a look-up to the location database based on the user identification.

After determining the location of the user, VOIP location system 135 generates a key that is used to identify the call. VOIP location system 135 continues the call setup process by transmitting the location of the user and the call key to PSAP 110. At the same time, VOIP location system 135 transmits the identity of the PSAP and the call key to VOIP gateway system 130. The PSAP is often times identified by a phone number. PSAP 110 receives the location information and the call key and waits for an incoming call associated with the call key.

VOIP gateway system 130 initiates call setup with selective router 120 by transmitting the PSAP identification and the call key to selective router 120. Selective router 120 responsively processes the PSAP identification to select the appropriate PSAP from a group of PSAPs. Selective router 120 then transmits call setup signaling to the selected PSAP, PSAP 110, indicating the call key. PSAP 110 receives the call setup signaling, recognizes the call key, and looks up the location of the caller based on the key provided by selective router 120. A bearer connection is established from VOIP phone 131 through VOIP gateway system 130, selective router 120, to PSAP 110. An operator at PSAP 110 is then able to direct emergency responders, such as the police, to the location of the caller.

In a wireless example, a wireless user using wireless phone 141 places an emergency call, such as by dialing 911. Wireless phone 141 responsively transmits the emergency call to MSC 140. Typically, wireless phone 141 transmits a user identification, such as a calling number, that MSC 140 can associate with the user.

Upon receiving the emergency call and user identification, MSC 140 initiates call setup for the emergency call by transmitting call setup signaling and the user identification to wireless location system 145. Wireless location system 145 continues the call setup process by determining the location of the user. Often times, the location of the user is determined using the global position system (GPS). Other times, the location of the user is determined using radio frequency triangulation techniques.

After determining the location of the user, wireless location system 145 generates a key that is used to identify the call going forward. Wireless location system 145 continues the call setup process by transmitting the location of the user and the call key to PSAP 110. At the same time, wireless location system 145 transmits the identity of the PSAP and the call key to MSC 140. The PSAP is often times identified by a phone number. PSAP 110 receives the location information and the call key and waits for an incoming call associaied with the call key.

MSC 140 initiates call setup with selective router 120 by transmitting the PSAP identification and the call key to selective router 120. Selective router 120 responsively processes the PSAP identification to select the appropriate PSAP from a group of PSAPs. Selective router 120 then transmits call setup signaling to the selected PSAP, PSAP 110, indicating the call key. PSAP 110 receives the call setup signaling, recognizes the call key, and looks up the location of the caller based on the key provided by selective router 120. A bearer connection is established from wireless phone 141, through MSC 140 and selective router 120, to PSAP 110. An operator at PSAP 110 is then able to direct emergency responders, such as the police, to the location of the caller.

As illustrated, communication network 100 in the prior art requires separate call handling processes for wireless emergency calls and VOIP emergency calls. Such a configuration is costly and inefficient. For example, two distinct trunks, trunks 101 and 102, are utilized to couple MSC 140 and VOIP gateway system 130 to selective router 120. Additionally, duplicate call handling processes are required in MSC 140 and VOIP gateway system 130 for routing emergency calls to selective router 120. Owning and operating multiple location determining systems for both wireless service and packet phone service problematically increases expenses and reduces operating efficiencies.

SUMMARY OF THE INVENTION

An embodiment of the invention helps solve the above problems and other problems by providing a converged communication network for emergency service call handling that utilizes the resources of both a wireless network and a VOIP network to handle emergency calls. In an embodiment of the invention, a communication network comprises a mobile switching center (MSC) configured to receive an emergency call from a wireless end device and transmit first call signaling indicating a call key for the emergency call and a public safety answering point (PSAP) for the call. The communication network also comprises a gateway system configured to receive the first call signaling, process the first call signaling to generate second call signaling indicating the call key and the PSAP, transmit the second call signaling to a routing system, and connect the emergency call from the MSC to the routing system.

In an embodiment of the invention, the gateway system is configured to process the first call signaling to select the routing system from a group of routing systems based on the PSAP.

In an embodiment of the invention, the MSC is configured to transmit a key request indicating the emergency call, receive a key response identifying the call key for the emergency call and identifying the public safety answering point (PSAP).

In an embodiment of the invention, the gateway system is configured to receive user communications for the emergency call from the MSC and transmit the user communications to the routing system.

In an embodiment of the invention, the gateway system is configured to receive the user communications in a synchronous format and transmit the user communications in an asynchronous format.

In an embodiment of the invention, the gateway system is configured to receive the user communications in a synchronous format and transmit the user communications in the synchronous format.

In an embodiment of the invention, a method of operating a communication network for emergency service call handling comprises receiving an emergency call into a mobile switching center (MSC) from a wireless end device, transmitting first call signaling from the MSC indicating a call key for the emergency call and a public safety answering point (PSAP) for the call, receiving the first call signaling into a gateway system, processing the first call signaling in the gateway system to generate second call signaling indicating the call key and the PSAP, transmitting the second call signaling from the gateway system to a routing system, and connecting the emergency call from the MSC to the routing system.

BRIEF DESCRIPTION OF THE DRAWINGS

The same reference number represents the same element on all drawings.

DETAILED DESCRIPTION OF THE PREFERRED EMBODIMENT

FIGS. 3-8 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

Figure 3:
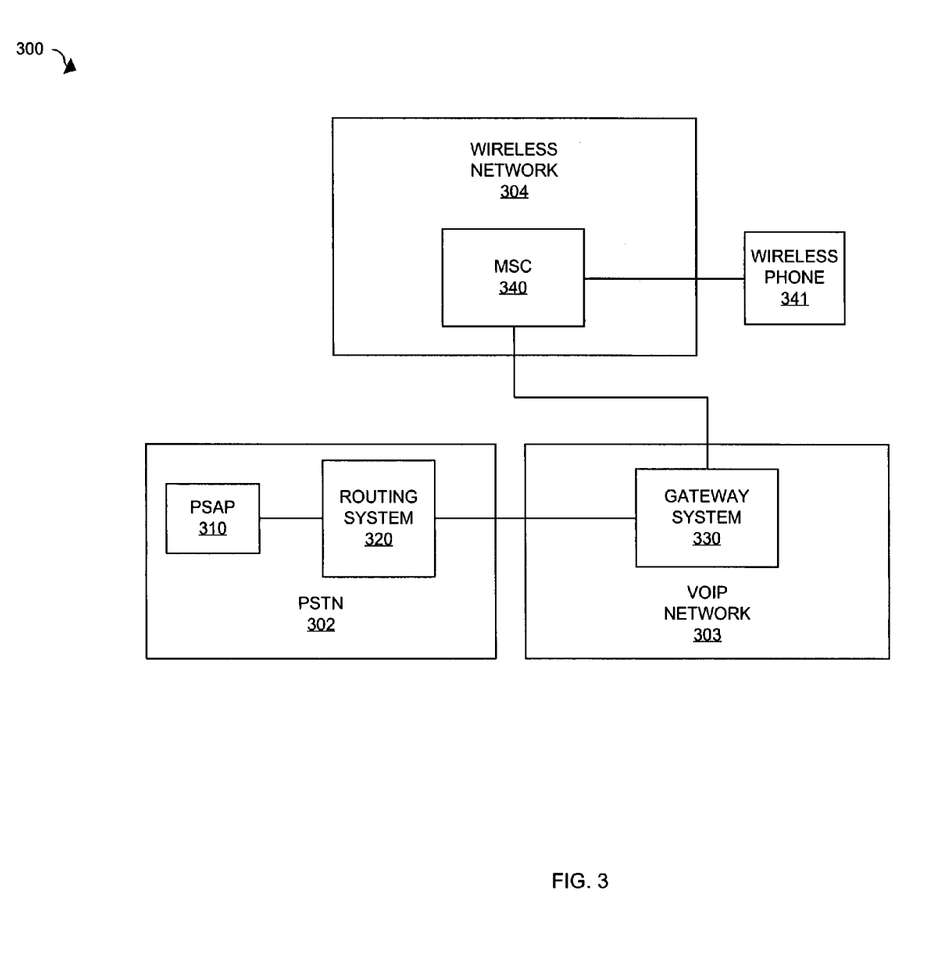
FIG. 3 illustrates a communication network in an embodiment of the invention.
Figure 4:
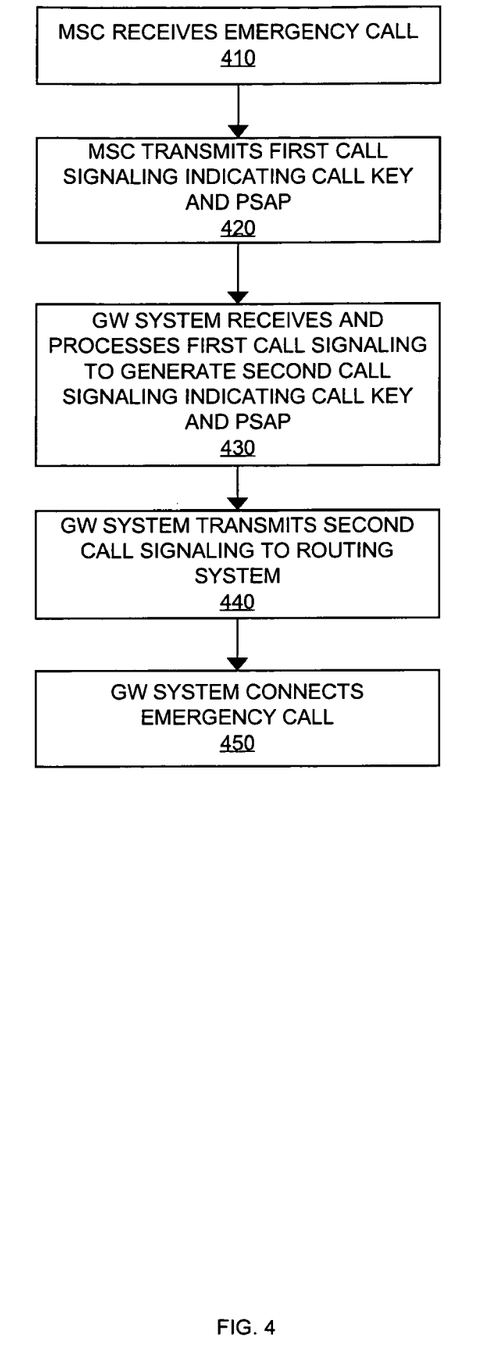
FIG. 4 illustrates the operation of a communication network in an embodiment of the invention.

FIGS. 3 and 4

FIG. 3 illustrates communication network 300 in an embodiment of the invention. Communication network 300 includes public switched telephone network (PSTN) 302, VOIP network 303 and wireless network 304. PSTN 302 includes routing system 320. VOIP network 303 includes gateway system 330. Wireless network 304 includes MSC 340 and wireless device 341. Other elements could be included, such as base station systems, but are not shown for purposes of clarity.

FIG. 4 illustrates the operation of communication network 300 in an embodiment of the invention. To begin, MSC 340 receives an emergency call from wireless phone 341 (Step 410). The call could be, for example, a 911 call. MSC 340 initiates call setup for the call by transmitting first call signaling indicating a call key for the emergency call (Step 420). The first call signaling also identifies a PSAP for the call. A location determination system could provide the key and the PSAP identification to MSC 340, as is commonly understood in the art.

Gateway system 330 receives and processes the first call signaling to continue the call setup process initiated by MSC 340 and generates second call signaling that identifies the call key and the PSAP (Step 430). Gateway system 330 then transmits the second call signaling to routing system 320 (Step 440) to setup a call leg for the call between gateway system 330 and routing system 320. Gateway system 330 connects the emergency call from MSC 340 to routing system 320 (Step 450). Routing system 320 processes the second call signaling to route the call to the appropriate PSAP. The PSAP uses the call key to link the incoming emergency call with the location of the caller. The location of the caller could be provided to the PSAP by the above mentioned location determination system, as well as other location determination systems.

Advantageously, communication network 300 improves the efficiency of and reduces the costs of operating both a wireless network and a packet based phone network. For example, only one link to routing system 320 is needed to route emergency calls to a PSAP in PSTN 302 from either VOIP network 303 or wireless network 304. This advantage significantly reduces costs because, often times, there are several MSCs serving a particular region. As such, rather than running several expensive TDM lines, such as DS0s, from each MSC to a routing system, such as a selective router, only one link is required between the routing system and the VOIP network.

Second Embodiment Configuration and Operation

FIGS. 5-8

Figure 5:
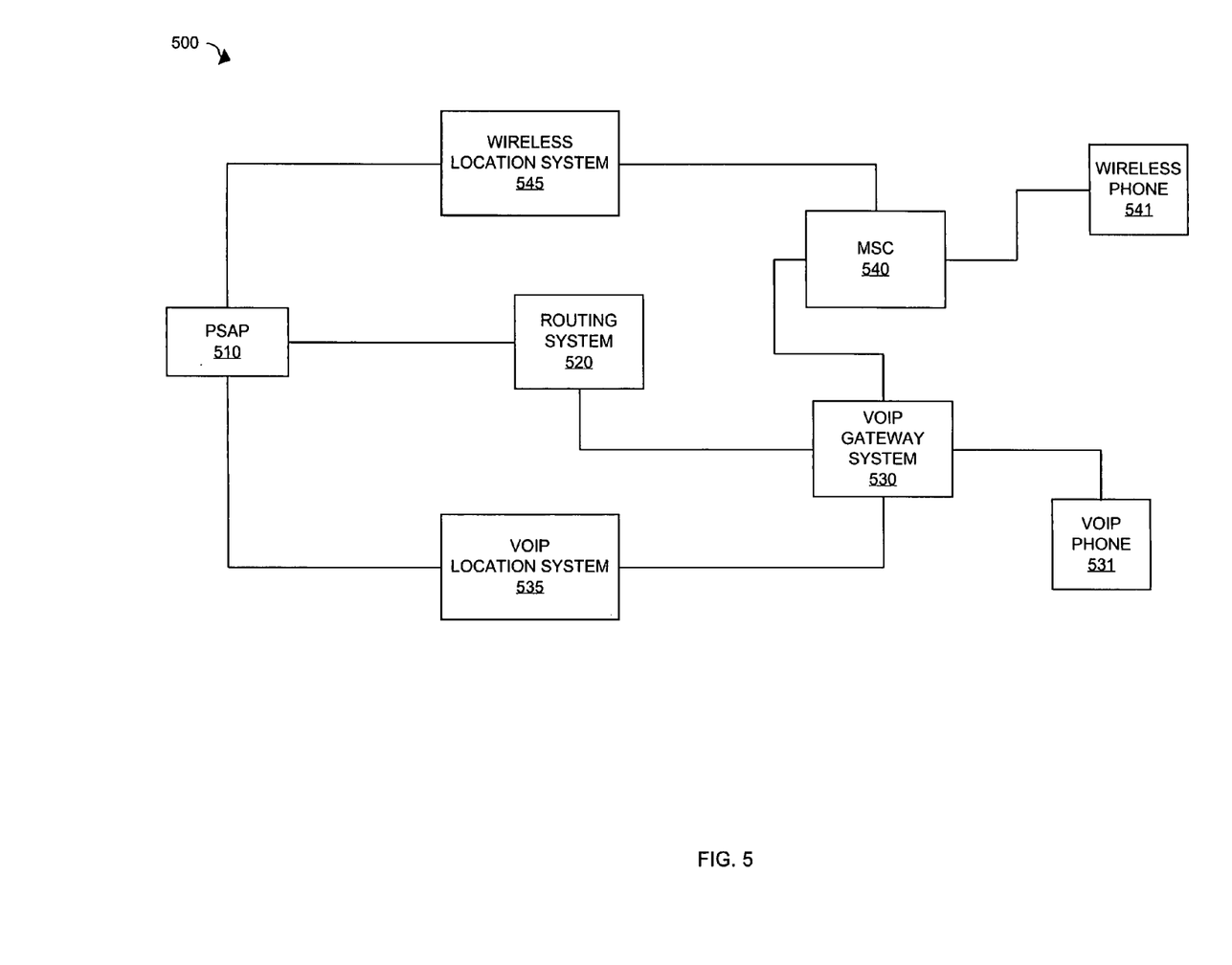
FIG. 5 illustrates a communication network in an embodiment of the invention.

FIG. 5 illustrates communication network 500 in an embodiment of the invention. Communication network 500 includes public safety answering point (PSAP) 510 coupled to wireless location system 545 and VOIP location system 535. Wireless location system 545 is coupled to legacy mobile switching center (MSC) 540. VOIP location system 535 is coupled to VOIP gateway system 530. MSC 540 is coupled to VOIP gateway system 530. VOIP gateway system 530 is also coupled to routing system 520. Wireless phone 541 is in communication with MSC 540. VOIP phone 531 is in communication with VOIP gateway system 530.

Figure 6:
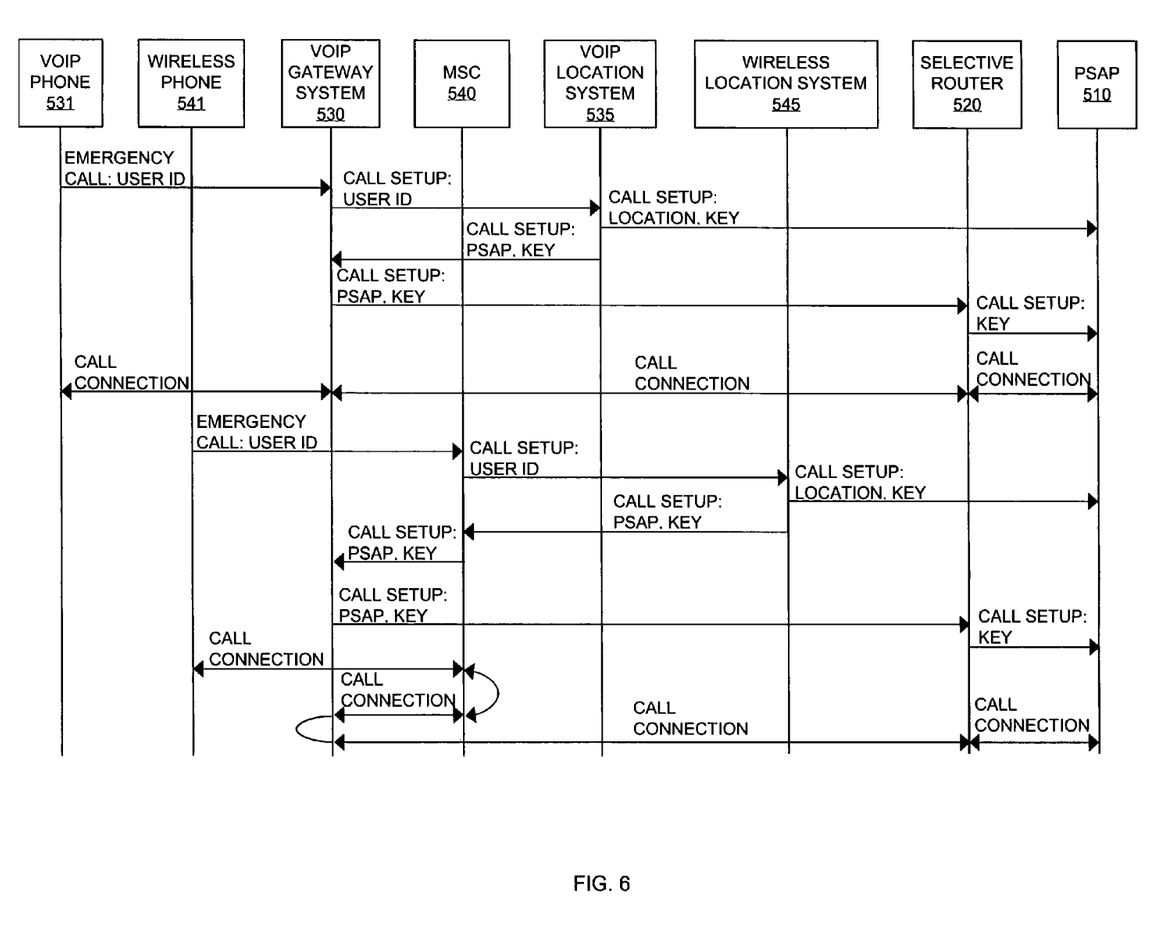
FIG. 6 illustrates the operation of a communication network in an embodiment of the invention.

FIG. 6 illustrates the operation of communication network 500 in an embodiment of the invention. A VOIP emergency call flow diagram is first described, followed by a description of a wireless emergency call flow diagram.

To begin, a VOIP user using VOIP phone 531 places an emergency call, such as by dialing 911. VOIP phone 531 responsively transmits the emergency call to VOIP gateway system 530. For instance, VOIP phone 531 might transmit the dialed digits along with a user identification that identifies the user to VOIP gateway system 530.

Upon receiving the emergency call and user identification, VOIP gateway system 530 initiates call setup for the emergency call by transmitting call setup signaling and the user identification to VOIP location system 535. VOIP location system 535 continues the call setup process by determining the location of the user based on the user identification. For example, VOIP location system 535 typically includes a location database that stores the physical address of users in association with their user identifications. In this case, VOIP location system 535 would perform a look-up to the location database based on the user identification.

After determining the location of the user, VOIP location system 535 generates a key that his used to identify the call. VOIP location system 535 continues the call setup process by transmitting the location of the user and the call key to PSAP 510. At the same time, VOIP location system 535 transmits the identity of the PSAP and the call key to VOIP gateway system 530. The PSAP is often times identified by a phone number. PSAP 510 receives the location information and the call key and waits for an incoming call associated with the call key.

VOIP gateway system 530 initiates call setup with routing system 520 by transmitting the PSAP identification and the call key to routing system 520. Routing system 520 responsively processes the PSAP identification to select the appropriate PSAP from a group of PSAPs. Selective router then transmits call setup signaling to the selected PSAP, PSAP 510, indicating the call key. PSAP 510 receives the call setup signaling, recognizes the call key, and looks up the location of the caller based on the key provided by routing system 520. A bearer connection is established from VOIP phone 531 through VOW gateway system 530, routing system 520, to PSAP 510. An operator at PSAP 510 is then able to direct emergency responders, such as the police, to the location of the caller.

In a wireless example, a wireless user using wireless phone 541 places an emergency call, such as by dialing 911. Wireless phone 541 responsively transmits the emergency call to MSC 540. Typically, wireless phone 541 transmits a user identification, such as a calling number, that MSC 540 can associate with the user.

Upon receiving the emergency call and user identification, MSC 540 initiates call setup for the emergency call by transmitting call setup signaling and the user identification to wireless location system 545. Wireless location system 545 continues the call setup process by determining the location of the user. Often times, the location of the user is determined using the global position system (GPS). Other times, the location of the user is determined using radio frequency triangulation techniques.

After determining the location of the user, wireless location system 545 generates a key that is used to identify the call going forward. Wireless location system 545 continues the call setup process by transmitting the location of the user and the call key to PSAP 510. At the same time, wireless location system 545 transmits the identity of the PSAP and the call key to MSC 540. The PSAP is often times identified by a phone number. PSAP 510 receives the location information and the call key and waits for an incoming call associated with the call key.

MSC 540 initiates call setup with gateway system 530 by transmitting call signaling indicating the PSAP identification and the call key to gateway system 530. Gateway system 530 responsively processes the call signaling to route the call to selective router 320. In some cases, there may be multiple selective routers. In such a case, gateway system 530 processes the PSAP identification to select the appropriate selective router based on the PSAP identification. For example, if the PSAP is identified by a phone number, gateway system 530 could select the selective router based on the area code of the phone number. Gateway system 530 then transmits call signaling to the selected selective router, in this case routing system 520, to setup a call leg for the call. The call signaling identifies the call key and the PSAP.

Upon having setup a call leg between gateway system 530 and routing system 520, routing system 520 transmits call setup signaling to the selected PSAP 510 indicating the call key. PSAP 510 receives the call setup signaling, recognizes the call key, and looks up the location of the caller based on the key provided by routing system 520. A bearer connection is established from wireless phone 541, through MSC 540 to gateway system 530, through gateway system 530 to routing system 520 and from routing system 520 to PSAP 510. An operator at PSAP 510 is then able to direct emergency responders, such as the police, to the location of the caller.

Figure 7:
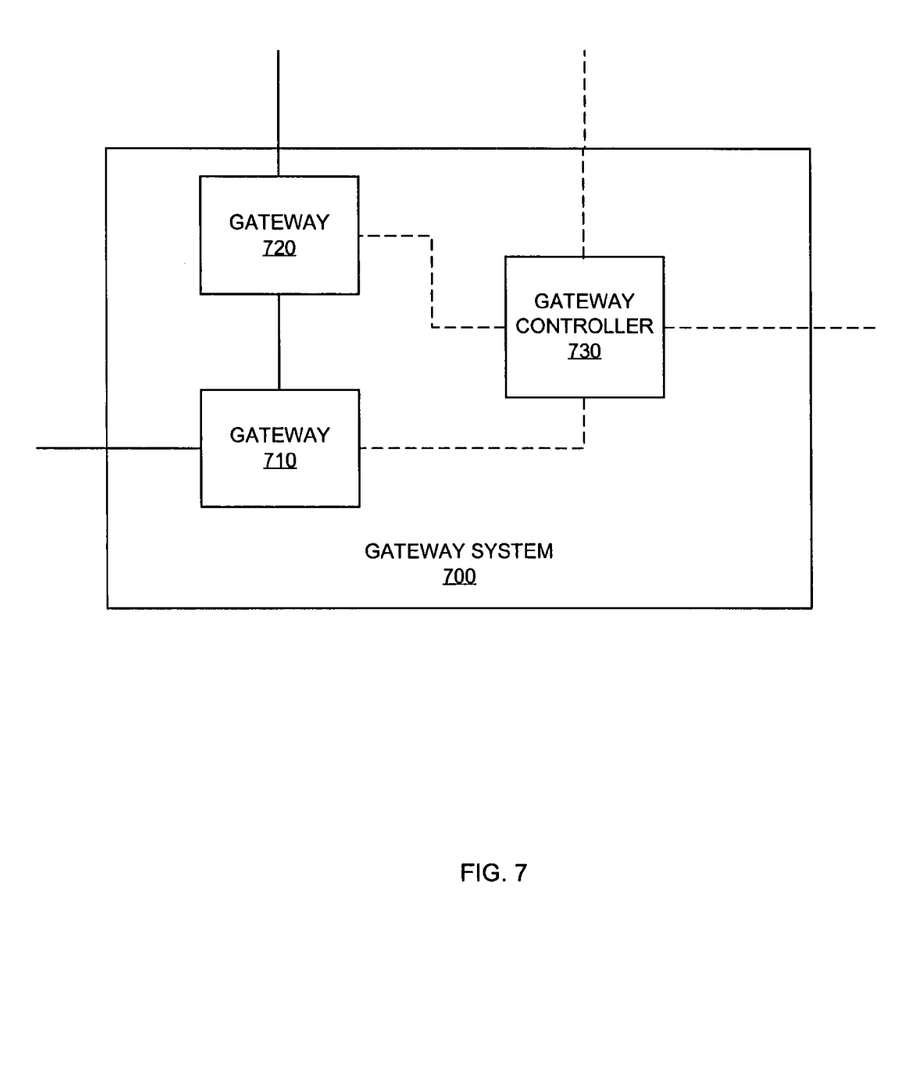
FIG. 7 illustrates a gateway system in an embodiment of the invention.

FIG. 7 illustrates gateway system 700 in an embodiment of the invention. Gateway system 700 could be illustrative of gateway systems, such as gateway systems 330 and 530 in FIGS. 3 and 5 respectively. Gateway system 700 includes gateway 720, gateway 710, and gateway controller 730. Other elements could be included, such as routers and packet switches, as well as other elements.

Gateway 710 is capable of receiving communications in one format and interworking the communications to a different format. Similarly, gateway system 720 is capable of receiving communications in one format and interworking the communications to a different format. For example gateway systems 710 and 720 could interwork communications between synchronous and asynchronous format. Examples of synchronous format include time division multiplexed (TDM) communications. Examples of asynchronous formats include packet formats, such as Internet Protocol (IP) based formats. Gateways 710 and 720 could also be referred to as media gateways, as well as by other terms.

Gateway controller 730 controls the operations of gateways 710 and 720. For instance, gateway controller 730 provides incoming and outgoing connection information to gateway 710 and 720. Gateway controller 730 is capable of receiving call signaling from external elements, such as mobile switching centers (MSCs) and routing systems. Gateway controller 730 is also capable of transmitting call signaling to external elements. Gateway controller 730 could also be referred to as a soft switch or a media gateway controller, as well as by other terms.

In operation, gateway controller 730 receives call signaling from external elements for calls. Gateway controller 730 processes the call signaling to setup the call. In some cases, the call could be incoming to gateway 720 and outgoing to gateway 710. In such a case, gateway controller 730 would instruct gateway 720 to receive synchronous communications on a link connecting gateway 730 and an originating system. Gateway controller 730 further instructs gateway 720 to interwork the synchronous communications to an asynchronous format, and transmit the asynchronous communications for the call to gateway 710. Gateway controller 730 also instructs gateway 710 to receive the asynchronous communications for the call and interwork the asynchronous call communications to a synchronous format. Gateway controller 730 further instructs gateway 710 to transmit the synchronous call communications on an outgoing link to a destination routing system, such as a selective router. The incoming and outgoing links could be, for example, TDM trunk lines incoming and outgoing from an MSC, a circuit switched routing system, or the like.

Figure 8:
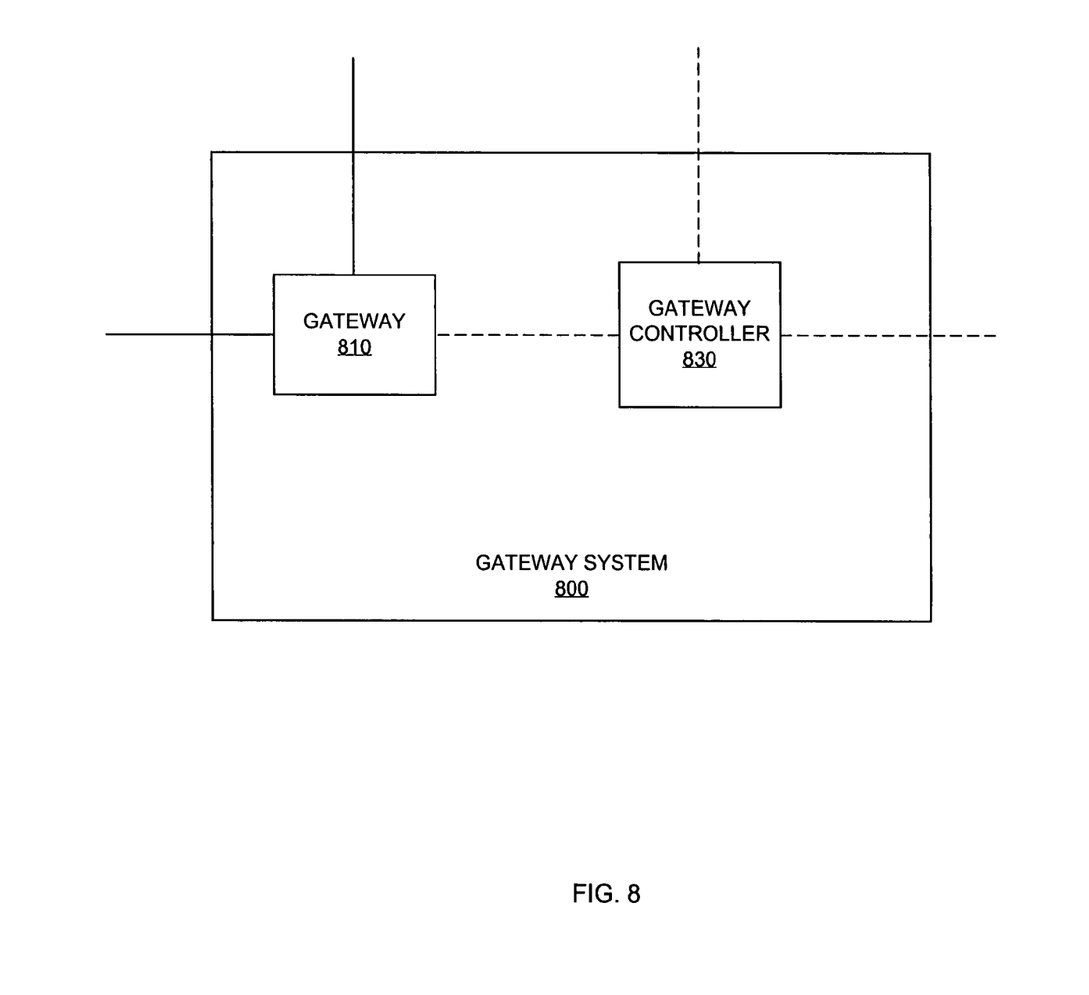
FIG. 8 illustrates a gateway system in an embodiment of the invention.

FIG. 8 illustrates gateway system 800 in an alternative embodiment of the invention. Gateway system 800 could be illustrative of gateway systems, such as gateway systems 330 and 530 in FIGS. 3 and 5 respectively. Gateway system 800 includes gateway 810, and gateway controller 830. Other elements could be included, such as routers and packet switches, as well as other elements.

Gateway 810 is capable of receiving communications in one format and interworking the communications to a different format. For example, gateway system 810 could interwork communications between synchronous and asynchronous formats. Examples of synchronous format include time division multiplexed (TDM) communications. Examples of asynchronous formats include packet formats, such as Internet Protocol (IP) based formats. Gateway 810 could also be referred to as a media gateway, as well as by other terms.

Gateway controller 830 controls the operation of gateway 810. For instance, gateway controller 830 provides incoming and outgoing connection information to gateway 810. Gateway controller 830 is capable of receiving call signaling from external elements, such as mobile switching centers (MSCs) and routing systems. Gateway controller 830 is also capable of transmitting call signaling to external elements. Gateway controller 830 could also be referred to as a soft switch or a media gateway controller, as well as by other terms.

In operation, gateway controller 830 receives call signaling from external elements for calls. Gateway controller 830 processes the call signaling to setup the call. In some cases, the call could be both incoming and outgoing through gateway 810. In such a case, gateway controller 830 instructs gateway 810 to bridge incoming communications to an outgoing link. The outgoing link could be, for example, a packet tunnel or another, similar type of virtual path. Gateway controller 830 further instructs gateway 810 to transmit the asynchronous call communications on the outgoing link to a destination routing system. The incoming links could be, for example, trunk lines incoming from MSCs, circuit switched routing systems, or the like. The destination routing system could be a packet communication network, a packet switch, a router, or the like.

What is claimed is:

1. A communication network for emergency service call handling, the communication network comprising:
   a mobile switching center (MSC) configured to receive an emergency call from a wireless end device and transmit first call signaling indicating a call key for the emergency call and a public safety answering point (PSAP) for the call; and
   a gateway system comprising:
      a gateway controller configured to receive the first call signaling, process the first call signaling to generate second call signaling indicating the call key and the PSAP, and transmit the second call signaling to a selective router;

a first gateway configured to receive user communications for the emergency call from the MSC in a synchronous format, convert the user communications to an asynchronous format, and transfer the user communications; and a second gateway configured to receive the user communications for the emergency call in the asynchronous format from the first gateway, convert the user communications to the synchronous format, and transfer the user communications to the selective router.

2. The communication network of claim 1 wherein the gateway system is configured to process the first call signaling to select the selective router from a group of routing systems based on the PSAP.

3. The communication network of claim 1 wherein the MSC is configured to transmit a key request indicating the emergency call, receive a key response identifying the call key for the emergency call and identifying the public safety answering point (PSAP).

4. A method of operating a communication network for emergency service call handling, the method comprising:

receiving an emergency call into a mobile switching center (MSC) from a wireless end device;

transmitting first call signaling from the MSC indicating a call key for the emergency call and a public safety answering point (PSAP) for the call;

receiving the first call signaling into a gateway controller of a gateway system;

processing the first call signaling in the gateway controller of the gateway system to generate second call signaling indicating the call key and the PSAP;

transmitting the second call signaling from the gateway system to a selective router;

receiving user communications for the emergency call from the MSC in a synchronous format into a first gateway of the gateway system;

converting the user communications to an asynchronous format in the first gateway of the gateway system;

transferring the user communications to a second gateway of the gateway system;

receiving the user communications for the emergency call in the asynchronous format from the first gateway into the second gateway of the gateway system;

converting the user communications to the synchronous format in the second gateway of the gateway system; and transferring the user communication from the second gateway of the gateway system to the selective router.

5. The method of claim 4 further comprising processing the first call signaling in the gateway system to select the selective router from a group of routing systems based on the PSAP.

6. The method of claim 4 further comprising transmitting a key request from the MSC indicating the emergency call and receiving a key response into the MSC identifying the call key for the emergency call and identifying the public safety answering point (PSAP).

\* \* \* \* \*